June 24, 1958  E. W. CARROLL  2,840,221
FRUIT ORIENTATORS
Filed March 27, 1950  3 Sheets-Sheet 1
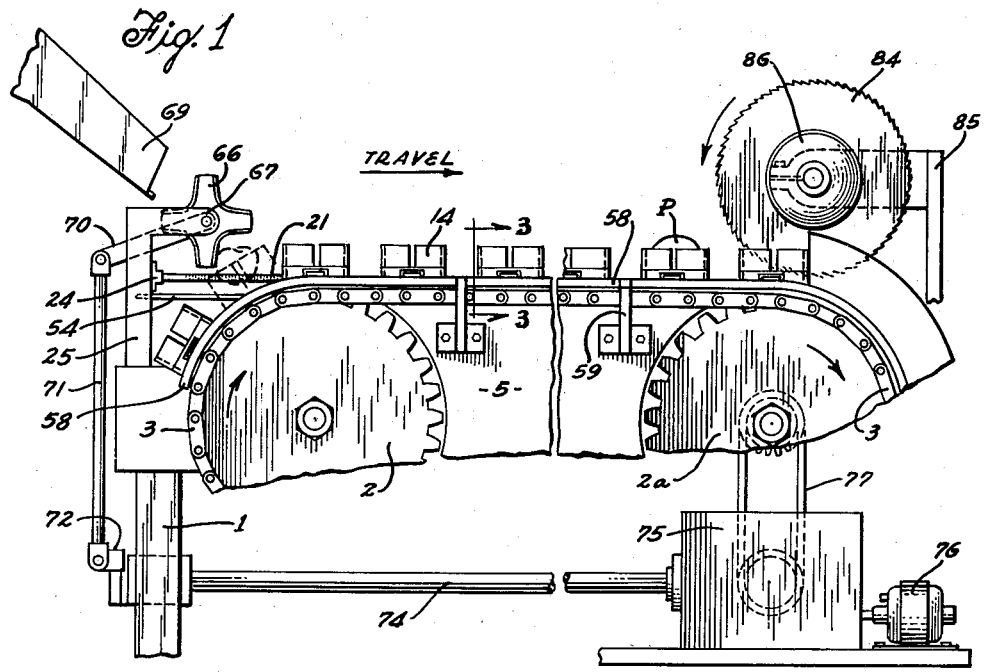
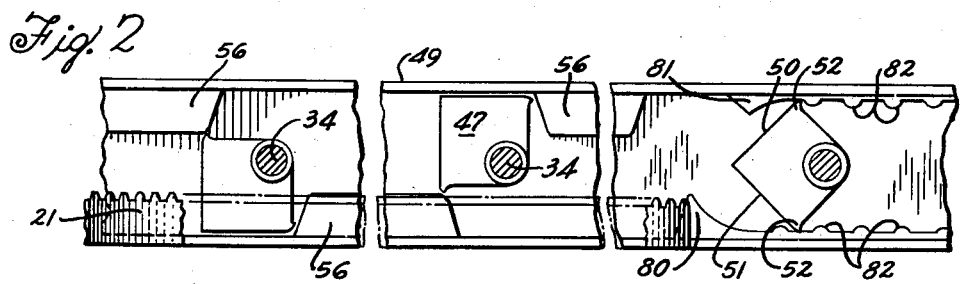
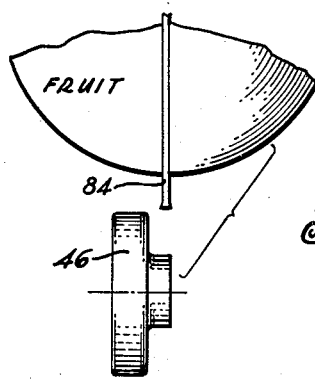
INVENTOR.
ELLSWORTH W. CARROLL
BY
Herbert E. Metcalf
HIS PATENT ATTORNEY June 24, 1958  E. W. CARROLL  2,840,221
FRUIT ORIENTATORS
Filed March 27, 1950  3 Sheets-Sheet 2
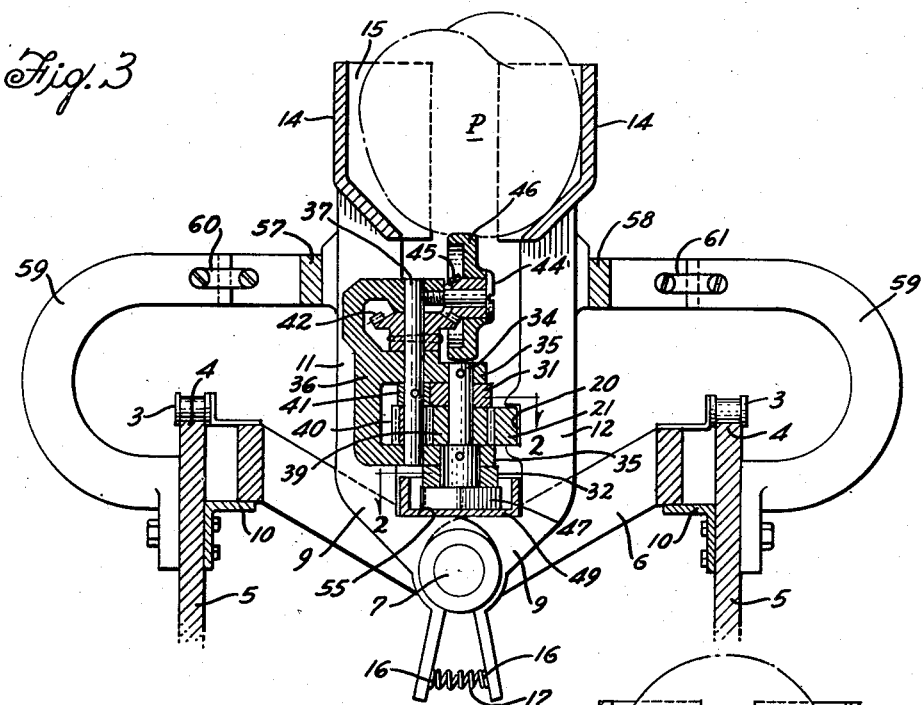
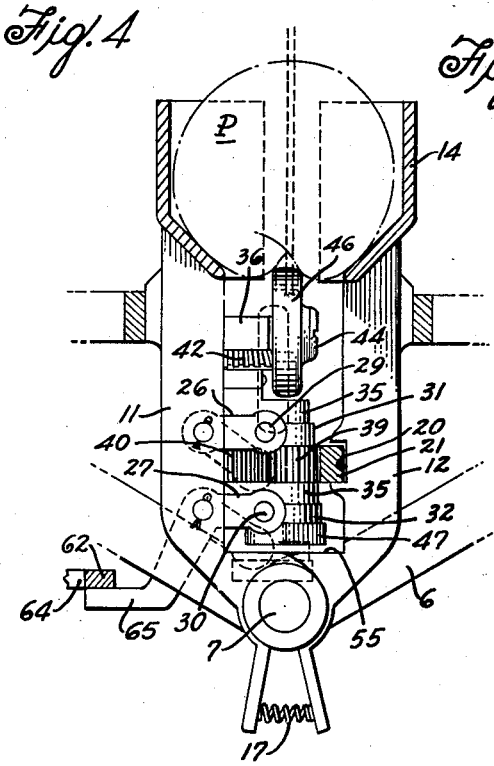
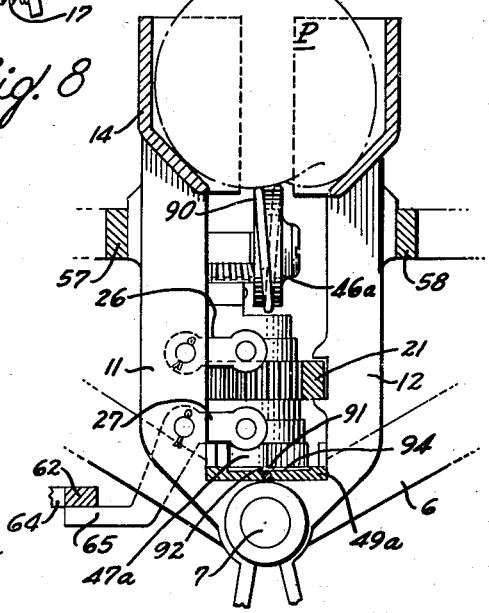
INVENTOR.
ELLSWORTH W. CARROLL
BY Herbert E. Metcalf
HIS PATENT ATTORNEY June 24, 1958  E. W. CARROLL  2,840,221
FRUIT ORIENTATORS
Filed March 27, 1950  3 Sheets-Sheet 3
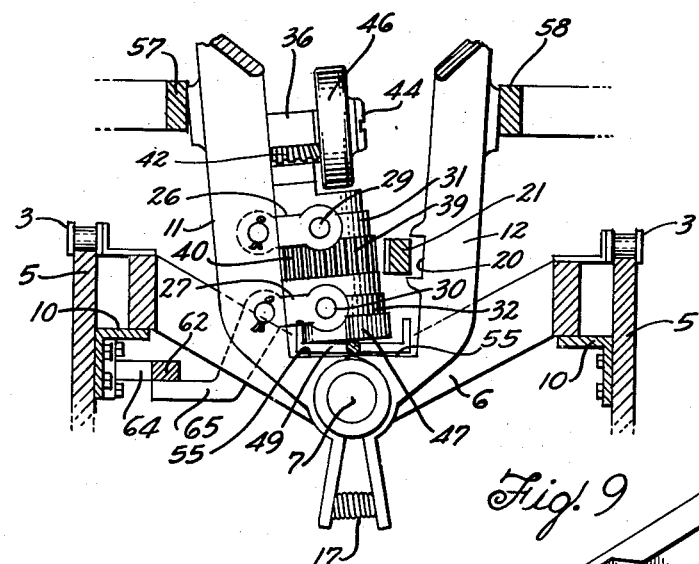
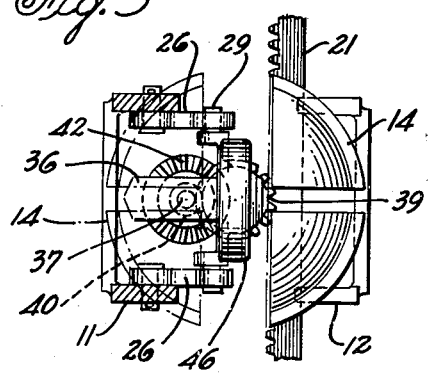
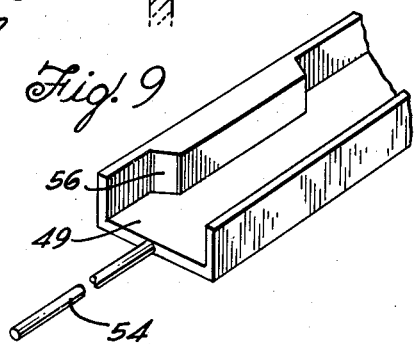
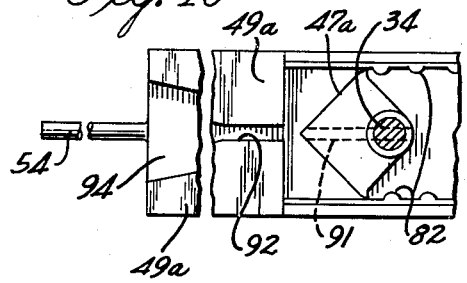
INVENTOR.
ELLSWORTH W. CARROLL
BY
Herbert E. Metcalf
HIS PATENT ATTORNEY

с

United States Patent Office 2,840,221
Patented June 24, 1958

2,840,221

FRUIT ORIENTATORS

Ellsworth W. Carroll, Redwood City, Calif., assignor to S & W Fine Foods, Inc., San Francisco, Calif., a corporation of California Application March 27, 1950, Serial No. 152,069

10 Claims. (Cl. 198—33)

The present invention relates to fruit orientators, and more particularly to a device whereby a fruit having a stem indent elongated in the plane of the seam or suture of the fruit may be orientated both as to stem indent and as to suture, preliminary to halving of the fruit, as by saw, for example.

The present invention is a modification of the device shown, described, and claimed in my prior application, Serial No. 98,260, filed June 10, 1949, for Fruit Orientation Devices, and is particularly useful in orientating peaches.

In the above identified application I disclosed and claimed apparatus adapted to orientate fruit such as peaches as to indent and seam in two stages. The first stage orientated the fruit as to indent and sometimes as to seam by rotating the fruit by the use of a wheel supporting a major portion of the weight of the fruit, the wheel being changed in is vertical plane of rotation during fruit rotation. As the deepest penetration of the wheel into the indent takes place when the wheel rotational plane registers with the indent and seam plane, some indent orientation took place on the rotating wheel. The fruit then passed into the second stage where substantially the entire weight of the fruit was supported on an indent shaped member while this member was being oscillated to various vertical planes so that the deepest penetration of the indent shaped member could take place. Thereafter, by withdrawing the indent shaped member in a predetermined position, all fruit properly orientated by the wheel and the indent shaped member would be left in a predetermined position in the machine, both as to indent and seam, so that further operation, such as inspection and halving could be performed on the fruit.

It is an object of the present invention to perform both indent and seam orientation in a single stage, and by the use of the same indent fitting member, i. e., the orientating wheel.

It is another object of the invention to provide a relatively simple means for orientating seamed fruit having an elongated stem indent both as to indent and seam location.

It is another object of the present invention to provide a simple mechanism for changing the attitude of an indented fruit while being rotated for indent orientation by an orientation member, such as a wheel.

Briefly, the present invention includes the use of fruit restraining means holding an indented seamed fruit such as a peach in a position where a major portion of its weight rests on an orientation member, such as a wheel, rotating in a vertical plane. While so resting, the wheel is power driven at all times to rotate the fruit to scan the fruit for the indent and the plane of wheel rotation is changed during the power rotation of the wheel. When the indent and wheel periphery register, the fruit ceases rotation, due to its weight. However, the registry of indent and wheel will not necessarily be complete so as to give registry of the wheel with the longest extent of the indent, so means are provided to stop the rotation of the wheel and then to move the wheel in various vertical planes to cause the fruit to settle on the wheel to the deepest extent, thereby causing the seam plane to coincide with the wheel plane. The wheel plane changes can be relatively slow and relatively fast, as well as of both high and low amplitudes, or a combination of such motions.

The present invention may be more fully understood by reference to the appended drawings, in which:

Figure 1 is a partial side elevation view of a carrier type machine embodying one preferred form of the present invention.

Figure 2 is a plan view of a wheel oscillating cam track utilized in the machine of Figure 1, taken as indicated by line 2—2 in Figure 3.

Figure 3 is a vertical view, partly in elevation and partly in section, of a fruit restraining means taken as indicated by line 3—3 in Figure 1.

Figure 4 is a vertical end view mostly in elevation showing a suspension means for the wheel support and drive unit of Figure 3.

Figure 5 is a top view of the wheel support unit shown in Figures 3 and 4.

Figure 6 is a fragmentary view of the wheel and arm structure taken as the cup halves are closing just prior to the beginning of the cam track shown in Figure 2.

Figure 7 is a fragmentary view in elevation showing the wheel position at the sawing stage.

Figure 8 is a view similar to that of Figure 4, showing a modified orientating wheel.

Figure 9 is a perspective view of the beginning of the cam track shown in Figure 2.

Figure 10 is a plan view of a cam track used with the modified wheel of Figure 8.

Referring first to Figure 1 for a general description of the machine, a frame 1 supports two spaced pairs of gears, a front pair 2 and a rear pair 2a, these gears rotating in vertical planes to carry therebetween a pair of endless carrier chains 3. Between each front and rear gear, the chains 3 are supported on the top horizontal edges 4 of two frame plates 5, best shown in section in Figure 3. Frame plates 5 are supported from frame 1 at each end thereof.

At regular intervals, the chains 3 are connected by cross bars 6, as shown in Figure 3, and each cross bar 6 carries a central horizontal pin 7. Each pin 7 has a pair of opposed arms 9 mounted thereon. The outer ends of cross bars 6 ride on brackets 10 attached to frame plates 5.

The ends of the upwardly extending portions 11 and 12 of the opposed arms 9 support opposed, curved cup halves 14 extending upwardly to define a fruit restraining recess 15 shown in Figure 3 as holding a peach P.

The lower portions of opposed arms 9 below pin 7 extend downwardly and outwardly to end in opposed spring retainers 16 over which is positioned a compression spring 17 tending to open or force apart the cup halves 14.

As seen in Figures 3, 4, 5, and 6, the two upwardly extending arm portions 11 and 12 are not alike. One arm portion 12 is cut away on the inner side to form a channel 20, which, when the opposed arms 9 are closed, supports a longitudinal rack 21 having vertical teeth 22 thereon. The exterior support of the rack 21 comprises a mounting flange 24 (Figure 1) at the front, only, of the machine, this flange secured to an upright 25 from the main frame 1.

The opposite arm portion 11 is provided with two upper links 26 and two lower links 27 pivotally connected at one end to the sides of the arm, as best shown in Figures 4 and 5. The other ends of the links contain two cross pins 29 and 30 pivotally connected to the upper 26 and lower 27 links, respectively. The cross pins 29 and 30 are fixed to bushings 31 and 32 which encircle a swivel shaft 35 freely rotatable in the bushings 31 and 32. Directly above each bushing, and pinned to the swivel shaft 34, is a foot 35 of a gear frame 36 containing a rotatable drive shaft 37. An idler gear 39, rotatable on the swivel shaft 34, is carried between the lower gear frame foot and the upper bushing 31, and this idler meshes with the rack 21 on one side and a drive shaft gear 40 with gear extension 41 attached to the drive shaft 37 on the other side.

Thus it is seen that the gear frame 36 is swingable as a unit with the swivel shaft 34, and is supported to pivot in a vertical plane by reason of the links 26 and 27.

The drive shaft 37 also carries a bevel gear 42, located above the upper foot 35, and a horizontal wheel stud 44 mounting a rotatable bevel pinion 45 which meshes with the bevel gear 42. An orientation wheel 46 is fixed to turn with the bevel pinion 45, this wheel 46 extending into the bottom of the fruit restraining recess 15 when the wheel support and drive unit is in its upper or working position as shown by the solid-line links in Figure 4. The wheel 46 is preferably smooth on its circumference, with a slightly rounded contour. The wheel suspension and drive unit is supported in a vertical direction as follows.

Below the lower bushing 32, the swivel shaft 34 terminates in a flat cam 47 horizontally positioned to operate in a cam track 49 as shown in Figures 2 and 9. Cam 47 has two rear surfaces 50 and 51 joined centrally at 90°, these surfaces terminating laterally in rounded corners 52. Cam track 49 is supported from the upright 25 at the front end only of the machine by a rod 54, and by shoulders 55 on each opposed arm 9. Thus it is seen that as the fruit holding receptacles are progressed along the top horizontal span of the machine with the opposed arm 9 closed, as will be described in full later, the cam 47 is slidably supported by the cam track 49 with the links 26 and 27 in their upper positions. Also, at this same time, the idler gear 39 is being rotated by the stationary rack 21 to drive the drive shaft 37 and therefore revolve the orientation wheel 46 in a vertical plane.

Cam track 49 is provided with cam blocks 56 alternately positioned on each side thereof to alternatively engage the rounded corners 52 of the cam 47 so that the cam is turned 90° at each cam block contact. This turning of the cam 47 rotates the swivel shaft 34 which carries with it the gear frame 36, so that the wheel 46 is oscillated about its vertical center line, which coincides with the center line of the swivel shaft 34. In turning the gear frame, the drive shaft gear 40 merely rolls around on the idler gear 39, while the cross pin bushings 31 and 32 and links 26 and 27 do not rotate. Thus as the cam 47 passes along cam track 49, the wheel 46 is positively driven at all times and is flipped from one 45° position to another away from the central vertical plane of the machine, remaining in each deflected position for a time determined by the length of each cam block 56, and the rate of progression of the carrier.

Referring again to Figures 3, 4, and 6, in conjunction with the remaining figures, a pair of arm cams 57 and 58 is utilized to control the position of opposed arms 9, and one arm cam is supported from each side plate 5 as by cam brackets 59, so that there is an arm cam on each side of the fruit restraining assembly. The arm cams are adjustable laterally as by adjustments 60 and 61. Arm cams 57 and 58 begin as each set of opposed cup halves rises around front gears 2 to enter the horizontal portion of the carrier path.

A link cam 62 (Figure 3), supported by a brace 64 from the left frame plate 5, is also provided before the beginning of the horizontal carrier path. It is the purpose of this link cam 62, which extends parallel to the frame plates 5, to raise the wheel suspension unit to the proper position for entering the starting end of the cam track 49. To this end, a link extension finger 65 is carried by one of the links 27 on each upper arm portion 11. With no support other than the arm portion 11, the wheel suspension unit is dropped down to occupy the dotted line position shown in Figure 4. As the fruit recesses 15 complete their rise around the front gears 2, the extension fingers 65 come into sliding contact with the lower side of the link cam 62 and are forced downwardly relative to the opposed arms 9, thus raising the links 26 and 27, and the wheel mechanism, to its upper, working position in line with the cam track 49.

Prior to reaching the arm cams 57 and 58, the cup halves 14 are also spread apart by the spring 17. As the recesses rise, the arm cams 57 and 58 are shaped to come closer together, thereby forcing the cup halves together by contact with upper portions 11 and 12 of opposed arms 9, to a position to hold fruit, graded for a particular machine run, loosely, so that the fruit can be freely revolved, in the recess 15 formed by the opposed cup halves 14, by the rotating wheel 46.

At the beginning of the horizontal portion of the carrier path, the fruit, such as peaches to be orientated, is loaded, preferably by utilizing the loader disclosed and claimed in my prior application cited above. Essentially, the loader, as shown in Figure 1, comprises a star wheel 66 mounted to rotate in a vertical plane on the upright 25 and having four fruit receiving recesses 67 thereon, each recess receiving a fruit from a fruit chute 69.

Star wheel 66 is rotated by a ratchet (not shown) operated by a ratchet arm 70 in turn operated by a vertical ratchet rod 71 driven by a crank 72 on the front end of a longitudinal shaft 74, this shaft being driven from a main gear box 75 in turn energized by a main motor 76. Gear box 75 also serves as the power output for progressing the carrier chains 3, by means of a drive chain 77 rotating the rear gears 2a. The rotation of star wheel 66 is timed so that one peach is dropped into each restraining recess 15 formed as the cup halves 14 reach the top of the front gears 2 to start progression along the horizontal path of the machine.

As the cup halves rise over the front gears 2, the arm cams 57 and 58 and the link cam 62 are so proportioned and curved as to permit the upper portions of the opposed arms 9 to move past the sides of the rack 21, and the cam 47 to move across the top of the rod 65 extending forward from the cam track 49, and then close the upper arm portions to place the rack 21 in the channel 20, and to center the cam 47 over rod 54 so that the cam can enter the cam track 49 which begins as soon as the upper arm portions 11 and 12 come together in fruit holding position.

The position of the fruit restraining assembly just as the upper arm portions are coming together is shown in Figure 6. As mentioned before, the orientating wheel 46 is positioned centrally below the restraining recess 15 and at a height such that when the fruit is first loaded, the major portion of its weight rests on the rotating wheel 46. This position is shown in Figure 3.

It is to be noted that the rack 21 and the cam track 49 are supported from the frame at their forward ends only. For the remainder of their lengths, they are supported by the moving fruit restraining assemblies. As several assemblies are on the horizontal path of the carrier at one time, and as all the idler gears 39 of these assemblies will be in contact with the rack 21, there is no tendency for the rack 21 to leave the channels 20.

After the fruit has been rotated in several vertical planes by the action of the shifting wheel in each receptacle, a large percentage of the fruit will be orientated as to indent, with the fruit indent registered with the wheel periphery. A certain percentage of the fruit will also have the elongation of the indent properly registered with the wheel.

At a certain point in the horizontal path of the carrier, the cam track 49 is provided with a cam turning block 80 (Figure 2) and with a following straightening block 81 on the opposite side of the cam track, slightly to the rear of the turning block 80. These latter two blocks turn the cam 47 in progressively shorter arcs so that the wheel 46 is parallel to the line of progression of the carrier and centrally positioned below the fruit restraining recess 15.

The sides of the cam track 49 thereafter are provided with opposite and alternate corner contacting projections 82 which contact corners 52 of the cam 47 to rapidly oscillate the wheel in vertical planes over short arcs. This action tends to settle the fruit down on the wheel and to rotate the fruit so that the elongation of the seam registers correctly with the plane of the wheel, thus providing additional seam orientation. It is to be noted that after leaving the 90° blocks 56 the rack 21 ends so that the wheel 46 is no longer driven by the rack 21 and is therefore, during this latter seam orientation, not rotating.

At the output end of the machine, a circular saw 84 is mounted on a saw bracket 85 erected from frame 1, this saw being driven by a saw motor 86 and being positioned in the central vertical plane of the machine so that peaches held in the recesses 15 will be bisected by the saw.

Just prior to reaching the saw 84, the arm cams 57 and 58 are positioned closer to the central plane of the machine, thus causing the fruit to be firmly grasped by the cup halves 14. Then the cam track 49 is discontinued, thereby allowing the wheel 46 and its drive unit to swing downwardly by gravity to a position out of the path of the saw 84, as shown in Figure 7, and in Figure 4 by the dotted lines. Further progression of the fruit restraining assembly passes the clamped fruit through the saw. When the orientation process as described has been successful, the two halves of the fruit are substantially alike, with half of the indent in each fruit half, and with the saw-cut through the seam of the fruit. In this manner a high percentage of top grade halves is assured.

After the fruit has been halved, it can be discharged for later removal of the pit halves, or the fruit halves may be separated and taken to a pitting station as in the machine of the application cited above, but as this pitting station is no part of the present invention it will not be described herein.

As described before, the action of the shifting wheel, obtained through the use of the cam blocks 56, causes the fruit to be rotated in different vertical planes, and therefore to bring the fruit indent over the wheel periphery, in which position the fruit will stop rotating because of the major portion of its weight now resting on the cup halves 14. This "scanning" of the fruit for indent can also be accomplished through the use of an improved orientation wheel, as shown in Figure 8. The new wheel 46a is provided with a raised helix 90 on the periphery thereof. As this wheel 46a rotates, the fruit is fed sideways while being turned. This permits scanning of the entire fruit surface for stem indent without the necessity for shifting the rotational plane of the wheel through its axis.

Therefore, a cam track 49a, as shown in Figure 10, having no turning blocks, may be used with this modified wheel 46a. During the first part of the fruit carrier progression along the machine, the cam 47a, having a downwardly extending ridge 91, aligned with the plane of the wheel 46a, is made to travel straight by a groove 92 cut in the top of the cam track 49a along the center line thereof, in which the ridge 91 is guided. At the very beginning of the cam track 49a, the groove 92 widens to form a V-shaped centering trough 94 so that the cam 47a and the entire wheel suspension unit will be straightened to the desired central position if the unit is in a rotated attitude after being raised by the links 26 and 27.

When the arm cams 57 and 58 come closer together at the start of the horizontal path as described previously, and reach their normal parallel position, the cam ridge 91 has just entered the narrow portion of the groove 92, so that the wheel suspension unit will not tend to twist and bind when the rack 21 and idler gear 39 are meshed in driving position. As also shown in Figure 10, the cam track 49a still retains the oscillating projections 82 to jiggle and settle the fruit after the stem indent has been orientated over the wheel 46a. It will be noted that just ahead of these projections 82, the sides of the groove 92 come to an end, thereby permitting the required wheel oscillation. The rack 21 also ends just before the projections 82 are reached, as in the previous form.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is, therefore, claimed in any of its forms or modifications within the legitimate and valid scope of the appended claims.

I claim:

1. Means for orientating seamed indented fruit comprising a carrier, means for progressing said carrier over a horizontal path, a plurality of means each forming a fruit restraining recess mounted on said carrier and having a vertical slot in the wall of said recess bisecting each recess in a vertical plane, a movable wheel support carried by each recess forming means, a horizontal wheel axle fixed to said movable support, an orientation wheel rotatably mounted on said axle, means for moving each support with relation to its respective recess to place said wheel with the plane of rotation thereof in a vertical plane at the bottom of the recess in a position to support at least a portion of the weight of a fruit in said recess and in a position obstructing at least a portion of said slot, means for changing the vertical plane of rotation of said wheels during progression of said carrier, means for rotating said wheel on said axle constantly during a predetermined portion of said horizontal path, and means for moving said wheel support to clear said slot; said movable wheel support comprising a housing member to which said wheel axle is fixed, a swivel shaft attached vertically to said housing and positioned directly below said wheel in line with the extended diameter thereof, a pair of bushings rotatably surrounding said swivel shaft, each bushing having laterally extending cross pins secured thereto, a link member pivotally connected to each of said cross pins and extending substantially perpendicular to the direction of motion of said carrier, said links being also pivotally connected to said recess forming means at one side of said slot; and a stationary cam positioned to contact and control the position of said movable support in the path of motion thereof as provided by said links.

2. Apparatus in accordance with claim 1 wherein said means for changing the vertical plane of rotation of said wheel is a pivot cam attached at the lower end of said swivel shaft, and a stationary cam track positioned below a plurality of said recess forming means, said cam track having projections thereon contacting said pivot cam to turn said swivel shaft and said housing.

3. Apparatus in accordance with claim 1 wherein said stationary cam is terminated prior to a wheel reaching said rotatable member, to permit downward movement of said movable wheel support about the pivot points of said link members.

4. Means for orientating seamed indented fruit comprising a carrier, means for progressing said carrier over a horizontal path, a plurality of means each forming a fruit restraining recess mounted on said carrier and having a vertical slot in the wall of said recess bisecting each recess in a vertical plane, a movable wheel support carried by each recess forming means, a horizontal wheel axle fixed to said movable support, an orientation wheel rotatably mounted on said axle, means for moving each support with relation to its respective recess to place said wheel with the plane of rotation thereof in a vertical plane at the bottom of the recess in a position to support at least a portion of the weight of a fruit in said recess and in a position obstructing at least a portion of said slot, means for changing the vertical plane of rotation of said wheels during progression of said carrier, means for rotating said wheel on said axle constantly during a predetermined portion of said horizontal path, and means for moving said wheel support to clear said slot; said slot being a space between two opposed receptacle halves forming said means for restraining fruit, and said wheel support being pivotally mounted on one of said halves.

5. Means for orientating seamed indented fruit comprising a carrier, means for progressing said carrier over a horizontal path, a plurality of means each forming a fruit restraining recess mounted on said carrier and having a vertical slot in the wall of said recess bisecting each recess in a vertical plane, a movable wheel support carried by each recess forming means, a horizontal wheel axle fixed to said movable support, an orientation wheel rotatably mounted on said axle, means for moving each support with relation to its respective recess to place said wheel with the plane of rotation thereof in a vertical plane at the bottom of the recess in a position to support at least a portion of the weight of a fruit in said recess and in a position obstructing at least a portion of said slot, means for changing the vertical plane of rotation of said wheels during progression of said carrier, means for rotating said wheel on said axle constantly during a predetermined portion of said horizontal path, and means for moving said wheel support to clear said slot; said movable wheel support comprising a housing member to which said wheel axle is fixed, a swivel shaft attached vertically to said housing and positioned directly below said wheel in line with the extended diameter thereof, a pair of bushings rotatably surrounding said swivel shaft, each bushing having laterally extending cross pins secured thereto, a link member pivotally connected to each of said cross pins and extending substantially perpendicular to the direction of motion of said carrier, said links being also pivotally connected to said recess forming means at one side of said slot; a stationary cam positioned to contact and control the position of said movable support in the path of motion thereof as provided by said links; and said means for rotating said wheel comprising a stationary gear rack positioned along the inside of a plurality of said recess forming means and terminating prior to a recess reaching said rotatable member, an idler gear rotatable on said swivel shaft meshing with said rack and revolved thereby during travel of said recesses, and wheel driving means rotatably mounted in said housing member, said wheel driving means having a permanent driven relationship with said idler gear and a permanent driving relationship with said wheel.

6. Means for orientating fruit comprising a plurality of pairs of fruit receptacle halves, a pair of hinged arms each arm supporting a receptacle half means for serially progressing said pairs over a vertical path followed by a horizontal path, means for moving each pair from an apart position into opposed relation to form fruit restraining recesses at the beginning of said horizontal path, a wheel cooperating with the bottom of each recess and rotatable in vertical planes to rotate a fruit in said recess, wheel rotating means mounted below each of said recesses and including a gear, a gear rack positioned parallel to said horizontal path and extending below a plurality of said recesses at one side thereof to mesh with said gears while said recesses are on a continuous portion of said horizontal path, said rack being partially supported by a half bearing in one of the arms of each pair, and end attachment means for one end only of said rack, said end attachment means being outside of said recesses at a point where said halves will close around said rack.

7. Apparatus in accordance with claim 6 including means for changing the vertical plane of rotation of said wheels while being progressed along said horizontal path.

8. Apparatus in accordance with claim 7 wherein said means for changing the vertical plane of rotation of each of said wheels comprises a movable wheel support mounted in each of said recesses and arranged to swing in a horizontal plane about a center line which is colinear with the vertical diameter of said wheel, a pivot cam attached to said movable support, and a cam track positioned below a plurality of said recesses, said cam track having projections thereon contacting said cam to turn said support.

9. Means for orientating fruit comprising a plurality of pairs of fruit receptacle halves opposed to form a fruit restraining recess therebetween, a carrier, means for progressing said carrier, half support means joining each of said halves separately to said carrier, a movable wheel support carried by only one of the half support means of each pair, a horizontal wheel axle fixed to said movable support, an orientation wheel rotatably mounted on said axle, means for moving each support with relation to its respective recess to place said wheel with the plane of rotation thereof in a vertical plane at the bottom of the recess in a position to support at least a portion of the weight of a fruit in said recess and in a position obstructing at least a portion of said slot, means for changing the vertical plane of rotation of said wheels during progression of said carrier, means for rotating said wheel on said axle constantly during a predetermined portion of said horizontal path, and means for moving said wheel support to clear said slot.

10. Apparatus in accordance with claim 9 wherein said wheel support is mounted to cause said wheel to move downwardly and laterally with respect to the line of carrier progression when operated on by said means for moving said wheel support to clear said slot.

References Cited in the file of this patent

UNITED STATES PATENTS

| | | |
|---|---|---|
| 1,079,573 | Morton | Nov. 25, 1913 |
| 2,100,455 | Souther | Nov. 30, 1937 |
| 2,505,235 | Derbenwick | Apr. 25, 1950 |